United States Patent
Frankenstein et al.

(10) Patent No.: US 8,764,377 B2
(45) Date of Patent: Jul. 1, 2014

(54) THRUST BEARING, ESPECIALLY FOR A TURBOCHARGER

(75) Inventors: Dirk Frankenstein, Worms (DE); Dag Hauschild, Offenburg (DE); Johann Hauser, Bernhardswald (DE); Jochen Held, Bolanden-Weierhof (DE); Stefan Nowack, Kirchheimbolanden (DE); Konrad Viessmann, Kalchreuth (DE)

(73) Assignee: Continental Automotive GmbH, Hannover (DE)

( * ) Notice: Subject to any disclaimer, the term of this patent is extended or adjusted under 35 U.S.C. 154(b) by 1085 days.

(21) Appl. No.: 12/740,751

(22) PCT Filed: Sep. 22, 2008

(86) PCT No.: PCT/EP2008/062601
§ 371 (c)(1),
(2), (4) Date: Nov. 5, 2010

(87) PCT Pub. No.: WO2009/056403
PCT Pub. Date: May 7, 2009

(65) Prior Publication Data
US 2011/0038716 A1  Feb. 17, 2011

(30) Foreign Application Priority Data
Oct. 31, 2007  (DE) .......................... 10 2007 052 101

(51) Int. Cl.
*F01D 3/04* (2006.01)

(52) U.S. Cl.
USPC ........................................... 415/104

(58) Field of Classification Search
USPC .......... 415/104, 106, 107; 384/420, 112, 123, 384/286, 295, 297, 368, 369, 370, 371
See application file for complete search history.

(56) References Cited

U.S. PATENT DOCUMENTS

| 3,495,886 A | 2/1970 | Roberts et al. |
| 3,565,498 A | 2/1971 | Leopard et al. |
| 4,639,148 A | 1/1987 | Tamura et al. |
| 5,556,208 A | 9/1996 | Ide |
| 6,024,495 A | 2/2000 | Loos et al. |
| 2002/0122610 A1 | 9/2002 | Shiraishi |
| 2003/0035603 A1 | 2/2003 | Kaiser |

FOREIGN PATENT DOCUMENTS

| DE | 1803413 A1 | 5/1969 |
| DE | 3901265 A1 | 7/1990 |
| DE | 19641673 A1 | 4/1998 |
| EP | 0971139 A2 | 1/2000 |
| GB | 1293665 A | 10/1972 |
| GB | 2200412 A | 8/1988 |
| JP | H08507136 A | 7/1996 |
| JP | 10121977 A | 5/1998 |
| JP | 2002039166 A | 2/2002 |
| JP | 2003232339 A | 8/2003 |

*Primary Examiner* — Dwayne J White
(74) *Attorney, Agent, or Firm* — Laurence A. Greenberg; Werner H. Stemer; Ralph E. Locher

(57) ABSTRACT

The invention relates to an axial bearing (10) comprising at least one or more segments (18) on each of the front side (22) and the rear side (26) thereof, wherein the segments (18) on the opposite sides (22, 26) each are disposed at least partially offset from each other.

20 Claims, 1 Drawing Sheet

THRUST BEARING, ESPECIALLY FOR A TURBOCHARGER

BACKGROUND OF THE INVENTION

Field of the Invention:

The invention relates to a thrust bearing (axial bearing), which can in particular be used in turbochargers, for example in motor vehicles.

In general turbochargers serve to improve the efficiency of an internal combustion engine and thereby to increase its power. For this purpose a shaft is supported rotatably about the longitudinal axis in the housing of the turbocharger, for example by means of two radial bearings. Arranged on the shaft a turbine wheel and a compressor wheel. However strong axial forces can occur in such cases as a result of fluid flows which attack the turbine wheel and the compressor wheel. Such axial forces cannot be suitably taken up by the radial bearings so that normally at least one additional thrust bearing is provided.

In general very high demands are imposed on supporting the shaft of a turbocharger. The reasons for this are that a turbocharger is subjected to comparatively high temperatures since the turbine wheel is driven by a hot exhaust gas of the engine. Furthermore the shaft of a turbocharger reaches very high speeds of up to 300,000 rpm for example. This means that the rotating parts of the turbocharger must be balanced very precisely in order to keep the occurrence of vibrations as small as possible.

It is known from the prior art that in the production methods used for thrust bearings the segments of the bearing can be made to stand out by deep embossing of the surrounding surfaces. The solidification of the material by the deformation however presents problems at this point. The more strongly the material must be moved or the more material has to be forced to the side, the harder the material becomes. The result of this is that more wear occurs on the corresponding deep embossing tool and in addition more force is necessary for deep embossing.

The restrictions caused by these problems have been taken into account thus far. This means that only specific materials and embossing depths have been able to be realized.

BRIEF SUMMARY OF INVENTION

Accordingly the object of the present invention is to provide an improved thrust bearing.

This object is achieved by a thrust bearing with the features of the independent claim(s).

Accordingly a thrust bearing is provided by the invention which features at least one or more segments on its front side and its rear side, with the segments on the opposing sides being arranged at least partly offset in relation to one another in each case.

In this case the thrust bearing has the advantage that through the least partly offset arrangement of the segments on the opposing sides less material has to be displaced than is the case in a prior art for example where the segments are arranged directly opposite one another. This makes the material less hard so that there is lower wear on the corresponding embossing tool for producing the segments. In addition less force is necessary during embossing and greater embossing depths can be achieved. In addition materials can also be used for producing the thrust bearing which have a lower formability than the materials currently used with conventional thrust bearings. A further advantage is that the at least partly offset arrangement of the segments provides more configuration possibilities in relation to the design of the thrust bearing.

Advantageous embodiments and developments of the invention emerge from the dependent claims as well as from the description which refer to the drawings.

In accordance with one embodiment of the invention the segments are arranged in segment sections of the thrust bearing, with the segment sections being arranged at least partly or completely running around a through-opening of the thrust bearing. The segment sections in this case each form a recess into which lubricating oil for lubricating the thrust bearing will be accepted. The form of the segments can be embodied in a wedge shape in such cases and optionally the segments on the upper side can additionally be provided with at least one bevel. In principle the segments can however have any shape suitable for fulfilling a predetermined function or purpose.

In a further inventive form of embodiment all or at least one part of the segments are arranged offset completely in relation to each other on the opposing sides of the thrust bearing. In other words the opposing segments adjoin each other directly with their ends and do not overlap. The advantage of this is that the material which is compressed on one side of the bearing can be pressed out directly on the opposite side in order to form a corresponding segment there. In this way only a little material must be moved to change the shape.

In another inventive form of embodiment all or at least a part of the segments are arranged partly offset from one another on the opposing sides of the thrust bearing. The opposing segments overlap each other in such cases with at least one or both ends. The partial overlapping has the advantage of providing a high level of design freedom in the arrangement of the segments or of their embodiment.

In accordance with a further inventive embodiment all or at least a part of the segments are arranged completely offset in relation to each other on the opposing side of the thrust bearing such that a gap is made between the ends of the opposing segments. Here too only a little material must be moved during reshaping.

In another inventive form of embodiment the through-opening of the thrust bearing is provided on the front and/or rear side with an inner collar. The inner collar in such cases can at least reduce the passage of lubricating oil out of the segment section through to the through-opening or essentially prevent it so that the lubricating oil remains despite this in the respective segment section for lubricating axle bearing. The greater is the embossing depth of the segments or of the segment section the more lubricating oil can be accepted into the segment section.

In a further inventive embodiment the thrust bearing features a least one oil reservoir on one or both sides of the thrust bearing, with the oil reservoir being connected via a channel to the segment sections on both sides, for example via a groove The channel has the advantage that it can for example be produced very easily by milling-in or embossing-in a groove, with the groove easily able to be cleared out after the milling and not able to be blocked with swarf like a hole can be for example. Cleaning is not necessary during embossing.

In accordance with an inventive embodiment the segments are typically produced by deep embossing. Deep embossing has the advantage of enabling the segments to be produced very simply and comparatively quickly and cheaply by comparison with a milling process for example.

In another inventive embodiment the thrust bearing is typically provided for a turbocharger, with it also able to be used for another device however in which thrust bearings with segments are needed.

The invention is explained below in greater detail on the basis of the exemplary embodiment specified in the schematic figures of the drawings. The drawings show:

DESCRIPTION OF THE INVENTION

In all figures—unless stated otherwise—the same elements and facilities or those with the same functions are provided with the same reference symbols.

Figure 1:
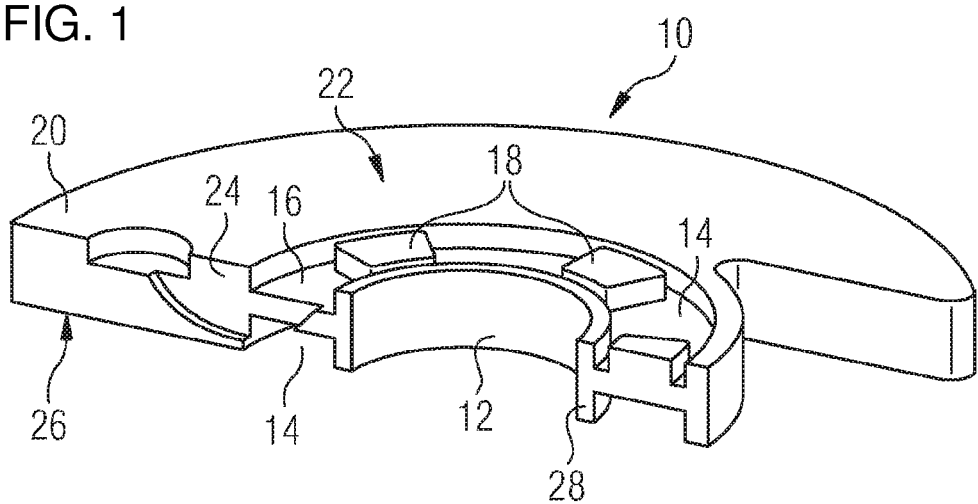
FIG. 1 a perspective sectional view of and thrust Zone Name: bearing of one form of embodiment of the invention.

FIG. 1 shows the perspective sectional view of a thrust bearing 10 (axial bearing 10) as can be used in accordance with the invention. The thrust bearing 10 in this case typically has a substantially flat or disk-shaped design.

In the center the thrust bearing 10 is provided with a through-opening 12 with which it can for example be pushed onto a shaft of an exhaust gas turbocharger (not shown). In addition the thrust bearing 10 is provided on its front and rear side 22, 26 with a segment section 14 or segment space running all the way around it. The segment space 14 is embodied in this case in the shape of a recess 16.

This provides segments 18 which are arranged in the segment section 14. The segments 18 in this case are arranged on the opposing sides 22, 26 preferably at least partly offset in relation to one another, as is explained in more detail in relation to FIG. 3. The segments 18 are embodied for example in the shape of wedges and arranged radially around the through-opening 12. Basically the segments 18 can also have any other form and arrangement however as well as being provided in any number depending on function or purpose. In this case the segments 18 can also be provided with an additional bevel, as is shown below in FIG. 3.

Furthermore an oil reservoir 20 is provided on the first side 22 of the thrust bearing 10. The oil reservoir in this case is arranged above the segment section 14 and is connected via a channel 24 to the segment space. It is also conceivable in an alternate embodiment for the channel 24 to additionally be connected to the through-opening 12. The channel 24 typically connects the first and second side 22, 26 of the thrust bearing 10. In this way an oil supply is provided for the segment sections 14 on the first and second side 22, 26 of the thrust bearing 10. The channel 24 in this case can typically be provided in the form of a groove, with the groove being able to be produced for example by means of milling or embossing.

Furthermore an inner collar 28 is provided on the through-opening 12 of the thrust bearing 10, which delimits the respective segment section 14. The inner collar prevents the lubricating oil from the respective segment section 14 passing unhindered into the area of the through-opening 12 for the shaft.

Figure 2:
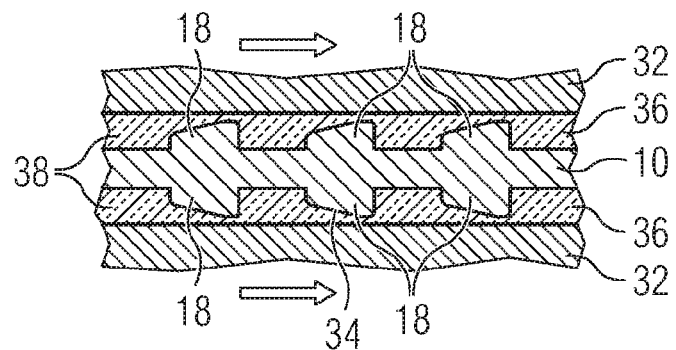
FIG. 2 a schematic view of a thrust bearing in accordance with the prior art which has been unwound along the central diameter, and FIG. 3 a schematic view of a thrust bearing in accordance with the invention, which has been unwound along the central diameter.

FIG. 2 now shows a schematic view of a thrust bearing 10 in accordance with prior art which has been unwound along the central diameter. In this case the thrust bearing 10 is arranged on a shaft between two bearing collars 32. The thrust bearing 10 in this case features segments 18 on its first and second side 22, 26 which in this case are typically each provided additionally with a bevel 34.

The segments 18 in this case are arranged in accordance with the prior art symmetrically opposite one another. In the recesses 38 between the segments 18 and between the bearing collars 32 and the segments 18 there is a film of oil 36 for lubricating the thrust bearing 10. The thrust bearing in accordance with the prior art has the disadvantage however that in the embossing process for producing the segment 18 a very large amount of material must be forced or reshaped onto the opposing sides 22, 26 of the thrust bearing. This leads to the solidification of the material being increased. Thus the more the material has to be moved or the more material has to be forced to the side, as is shown here in FIG. 2, the harder the material becomes. This results in greater wear on the corresponding embossing tool for producing the segments 18. In addition a significant force is necessary during deep embossing.

Figure 3:
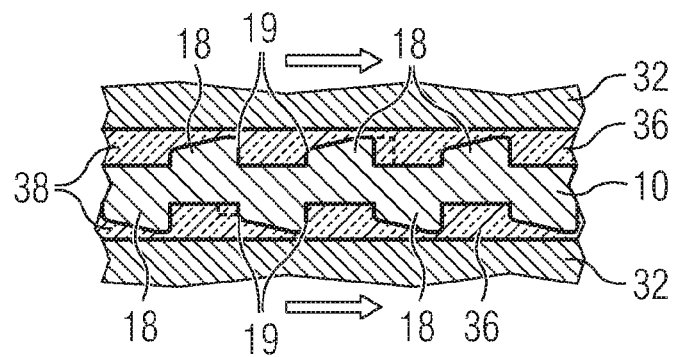

FIG. 3 on the other hand shows an inventive thrust bearing 10 in a schematic view, with the thrust bearing 10 in this case for example having a structure like the thrust bearing 10 depicted in FIG. 1. However the invention is not restricted to the embodiment shown in FIG. 1 but can be applied to a plurality of differently-shaped thrust bearings in which segments are provided on two sides of the bearing.

The thrust bearing 10 in accordance with the diagram in FIG. 2 is likewise unwound along the central diameter. Like the thrust bearing 10 depicted in FIG. 2, the thrust bearing 10 in FIG. 3 is also arranged in a housing of the turbocharger on a shaft 30 between two bearing collars 32. In this case the segments 18 on the first side 22 of the thrust bearing 10 are arranged alternating or offset to the segments 18 on the second side 26 of the thrust bearing 10. In this case a film of oil 36 lubricating the thrust bearing 10 is provided in the recess 38 between the segments 18 and typically between the respective bearing collar 32 and the segments 18.

The segments 18 or at least a part of the segments 18 can in this case each be arranged exactly offset on both sides of the thrust bearing 10 so that no gap between the opposing segments 18 arises, as is shown in FIG. 3. In other words the opposing segments 18 do not overlap each other but adjoin each other directly with their ends 19.

As an alternative the segments 18 or at least a part of the segments 18 can however also be arranged offset in relation to each other on the opposite sides 22, 26 of the bearing 10 so that a gap (not shown) between the opposing segments 18 is formed. In this case the segments 18 in FIG. 3 would typically be arranged somewhat displaced from one another so that a gap arises between the ends of the opposing segments 18 in each case.

In a further alternative the segments 18 or at least a part at the segments 18 can also overlap partly or at least slightly in relation to each other at their ends 19, as is indicated in FIG. 3 by way of example and greatly simplified by a dashed line.

In a comparison of the two thrust bearings 10 in accordance with FIGS. 2 and 3 it becomes clear that the proportion of material to be deformed is very much smaller because of the inventive offset arrangement of the segments 18. This means that the hardening of the material in the invention is less, whereby greater deformations can be created with lesser force than in the prior art.

In the application or the production process of the thrust bearing 10 no disadvantages arise because of the production of the offset arrangement since in this case there is essentially no interactions between the first and the second side 22, 26 of the thrust bearing 10. This means that further degrees of freedom are available for the construction as regards the design and the material, without any disadvantages being created in the manufacturing process.

As a rule a material is selected for a thrust bearing 10 typically considering such factors as its suitability to be reshaped as well as the aspect of emergency operation characteristics and dry running. In accordance with the invention materials can now also be used which were not previously used or could not previously be used since their formability was not sufficient for bearings of the prior art.

Although the present invention has been described here with reference to the preferred embodiments, it is not restricted to the latter but is able to be modified in numerous ways. The previously described embodiments are able to be combined with one another in this case, especially individual features thereof.

In particular the exemplary embodiments for the arrangement of the segments can be combined with one another. Thus a part of the segments can typically partly overlap and another part of the segments can be arranged completely offset in relation to one another. Optionally in this case, in addition or as an alternative, a gap can also be provided between the opposing segments if these are arranged completely offset in relation to one another.

Furthermore the thrust bearing cannot only be provided for a turbocharger but for a plurality of further applications and technical areas in which thrust bearings with segments are used. The embodiment of a thrust bearing as depicted in FIG. 1 is merely an example for a plurality of possibilities for designing a thrust bearing.

The invention claimed is:

1. A thrust bearing configuration, comprising:
a thrust bearing having a front side and a rear side opposite said front side;
a rotatable shaft of an exhaust-gas turbocharger, said thrust bearing mounted on said rotatable shaft; and
one or more segments formed on each of said front and rear sides, said segments having defined end walls;
said segments on said mutually opposing front and rear sides being at least partly offset in relation to each other, with all or at least some of said segments being arranged completely offset in relation to each other on said mutually opposing front and rear sides, and with said end walls of opposing said segments directly aligned with one another.

2. The thrust bearing configuration according to claim 1, wherein said segments are disposed in segment sections of said thrust bearing, with said segment sections being arranged at least partly or completely surrounding a through-opening formed in said thrust bearing.

3. The thrust bearing configuration according to claim 1, wherein some of said segments are partly offset from each other on said opposing front and rear sides, with opposing said segments partly overlapping each other at one or both said end walls in each case.

4. The thrust bearing configuration according to claim 2, wherein said through-opening is formed with an inner collar on one or both of said front and rear sides, and said inner collar reducing or eliminating a passage of lubricant from said segment section to said through-opening.

5. The thrust bearing configuration according to claim 1, which comprises at least one oil reservoir on one or both of said front and rear sides, said oil reservoir communicating via a channel with said segment sections on said front and rear sides.

6. The thrust bearing configuration according to claim 5, wherein said channel connected to said oil reservoir is a groove.

7. The thrust bearing configuration according to claim 1, wherein said segments are structures formed by deep embossing.

8. The thrust bearing configuration according to claim 1, configured as an axial bearing for a turbocharger.

9. A turbocharger, comprising at least one thrust bearing configuration according to claim 1.

10. A thrust bearing configuration, comprising:
a thrust bearing having a front side and a rear side opposite said front side;
a rotatable shaft of an exhaust-gas turbocharger, said thrust bearing mounted on said rotatable shaft; and
one or more segments formed on each of said front and rear sides, said segments having defined end walls;
said segments on said mutually opposing front and rear sides being at least partly offset in relation to each other, with all or at least some of said segments being arranged completely offset in relation to each other on said mutually opposing front and rear sides to form a gap between said end walls of mutually opposing said segments.

11. The thrust bearing configuration according to claim 10, wherein said segments are disposed in segment sections of said thrust bearing, with said segment sections being arranged at least partly or completely surrounding a through-opening formed in said thrust bearing.

12. The thrust bearing configuration according to claim 10, wherein some of said segments are partly offset from each other on said opposing front and rear sides, with opposing said segments partly overlapping each other at one or both said end walls in each case.

13. The thrust bearing configuration according to claim 11, wherein said through-opening is formed with an inner collar on one or both of said front and rear sides, and said inner collar reducing or eliminating a passage of lubricant from said segment section to said through-opening.

14. The thrust bearing configuration according to claim 13, which comprises at least one oil reservoir on one or both of said front and rear sides, said oil reservoir communicating via a channel with said segment sections on said front and rear sides.

15. The thrust bearing configuration according to claim 6, wherein said channel connected to said oil reservoir is a groove.

16. The thrust bearing configuration according to claim 10, wherein said segments structures formed by deep embossing.

17. The thrust bearing configuration according to claim 10, configured as an axial bearing for a turbocharger.

18. A turbocharger, comprising at least one thrust bearing configuration according to claim 10.

19. The thrust bearing configuration according to claim 1, wherein said structure on said front side forms a solid wedge that is entirely raised from the front side and said structure on said rear side forms a solid wedge that is entirely raised from the from the rear side.

20. The thrust bearing configuration according to claim 10, wherein said structure on said front side forms a solid wedge that is entirely raised from the front side and said structure on said rear side forms a solid wedge that is entirely raised from the from the rear side.

* * * * *